May 2, 1961
J. W. RICHARDSON, JR
2,982,589
MEANS TO REDUCE PISTON RING GROOVE WEAR
AND MINIMIZE CYLINDER SCUFFING
Filed March 11, 1960
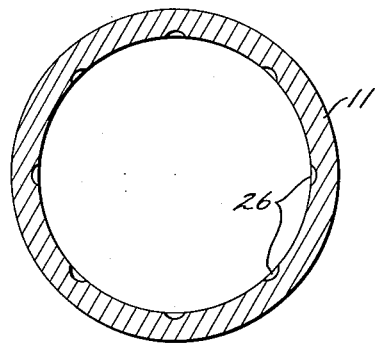
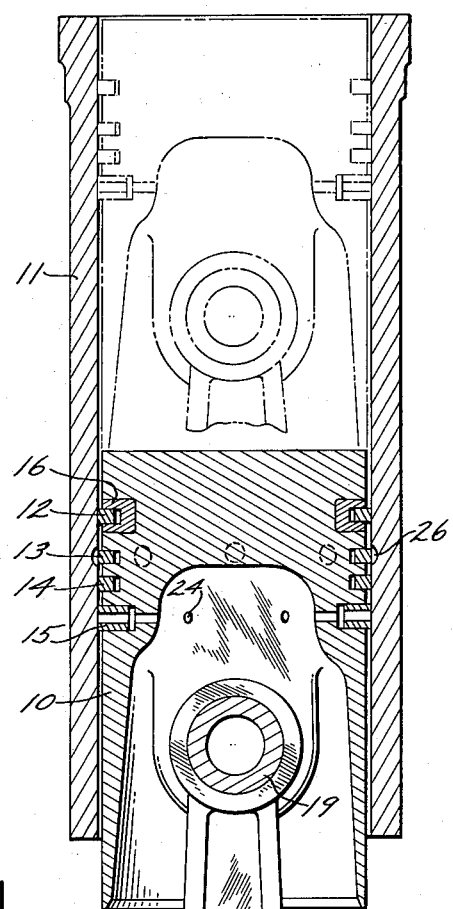
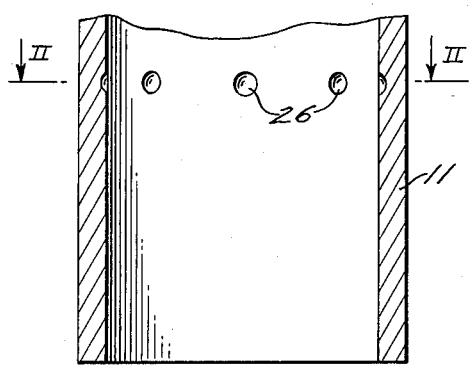
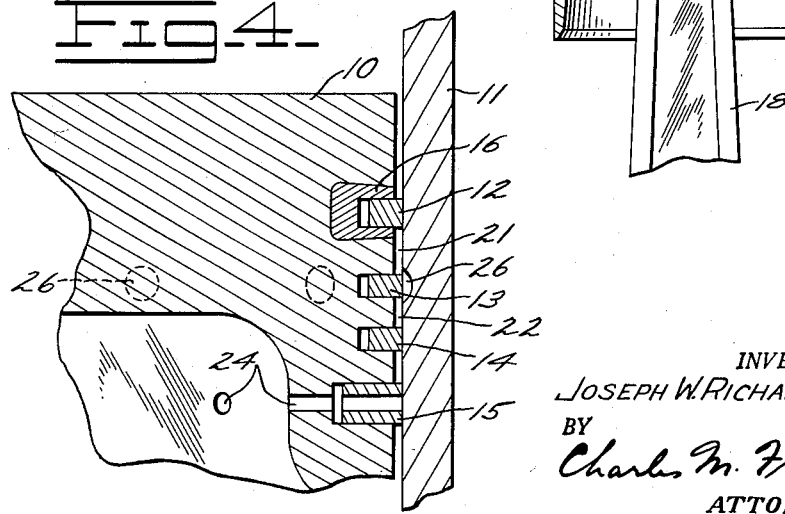
INVENTOR.
JOSEPH W. RICHARDSON JR.
BY
Charles M. Fryer
ATTORNEY United States Patent Office 2,982,589
Patented May 2, 1961

2,982,589

MEANS TO REDUCE PISTON RING GROOVE WEAR AND MINIMIZE CYLINDER SCUFFING

Joseph W. Richardson, Jr., Peoria, Ill., assignor to Caterpillar Tractor Co., Peoria, Ill., a corporation of California Filed Mar. 11, 1960, Ser. No. 14,421

4 Claims. (Cl. 309—1)

The present invention relates to improvements in cylinders or cylinder liners of internal combustion engines for the purpose of reducing wear in the piston ring groove of a piston operating in a cylinder and at the same time insuring ample lubrication between the compression ring and the cylinder or cylinder liner to prevent scuffing of the cylinder wall by the compression ring.

In my assignee's copending application of Robert E. Kennemer et al., Serial No. 764,887, filed October 2, 1958, and entitled "Grooved Cylinder Liner for Reduced Ring Groove Wear," one of the principal causes of ring groove wear is described as resulting from high pressures existing between the several rings of the piston in the space between the piston and the cylinder. Such high pressure results in differentials in pressure on opposite sides of the intermediate rings urging them against the walls of the ring grooves with a hammering effect thus wearing or enlarging the grooves and ultimately causing breakage or failure of the rings themselves. Said copending application discloses means for venting this high pressure and relieving ring groove wear in the form of grooves in the wall of the cylinder or liner extending in a generally vertical direction and adapted to register with the ring groove area of the piston when it is at bottom dead center position to effect release of pressure from between the rings upon each stroke of the piston. While the structure disclosed in said copending application has proven successful in the relief of excessive ring groove wear, it has been found that in certain engines it produces the undesirable result of reducing the pressure in the ring groove area to such an extent that insufficient pressure exists in this area to insure that lubricant is forced upwardly between the compression ring and the cylinder wall for adequate lubrication of the compression ring and that, therefore, scuffing occurs due to the movement of the inadequately lubricated compression ring over the surface of the cylinder wall.

It is the object of the present invention to eliminate excessive ring groove wear in an internal combustion engine by means which also insure adequate lubrication between the piston and the cylinder to prevent scuffing of the cylinder by the compression ring.

A further object of the invention is to minimize cylinder ring groove wear by equalizing pressure in the ring groove area on opposite sides of the intermediate ring while at the same time maintaining sufficient pressure in this area to insure the passage of lubricant beyond the compression ring particularly during the exhaust stroke of the piston.

The invention is described in detail in the following specification by reference to the accompanying drawings and in which further of its objects and advantages are made apparent.

In the drawings:

Fig. 1 is a central longitudinal sectional view of a piston and cylinder liner embodying the present invention with the piston shown at bottom dead center position and shown in broken lines at top dead center position;

Fig. 2 is a sectional view through a cylinder liner embodying the present invention taken on the line II—II of Fig. 3;

Fig. 3 is a fragmentary longitudinal sectional view of the liner shown in Figs. 1 and 2; and Fig. 4 is an enlarged fragmentary view of a portion of the piston and cylinder liner shown in Fig. 1 showing the position of the piston rings with respect to the liner when the piston is at bottom dead center position.

In Fig. 1 of the drawings, a piston 10 of a type conventionally used in internal combustion engines and the like is illustrated as disposed for reciprocation in the cylinder liner 11 which for the purposes of the present invention may be considered either as a liner or the usual cylinder bore formed within an engine block. Piston rings illustrated at 12, 13, 14 and 15 are retained in suitable grooves in the piston 10. The ring 12 is generally referred to as a compression ring while the rings 13 and 14 are termed intermediate rings and the ring 15 is known as an oil control ring. A hard metal insert as shown at 16 is customarily used in the area of the compression ring 12 to protect the piston against wear by the compression ring.

The piston 10 is reciprocable within the bore or liner 11 and is conventionally connected with the engine crankshaft, not shown, by a connecting rod 18 and wrist pin assembly as shown at 19. In conventional engines operating under high combustion pressures, the gas under pressure which originates in the cylinder above the piston escapes past the rings 12 and 13 and, upon continued operation, the space shown at 21 in Fig. 4 between the rings 12 and 13 and the space 22 between rings 13 and 14 become charged with gas pressure. Pressure is vented from the space below these rings due to the skeleton-like construction of the oil control ring 15 and vent passages 24 communicating between the back of the grooves which receive the ring 15 and the hollow interior of the piston.

The pressure which has built up in the areas 21 and 22 causes wear and enlargement of the grooves which receive the rings 13 and 14 in the manner set forth in detail in the copending application hereinabove referred to. In accordance with the invention disclosed in said application, this pressure is relieved through the vents 24 by grooves in the cylinder liner which extend in a generally vertical direction throughout the area occupied by both of the intermediate rings and the oil control ring when the piston is at bottom dead center position. This causes a very low or nearly atmospheric pressure in the ring groove area between the piston and the liner in contrast to the very high pressure in the combustion chamber above the piston which tends to force lubricant downwardly or away from the head end of the piston. This results in a dry liner and scuffing by the compression ring 12.

According to the present invention, the pressure in the ring groove area is not materially reduced but the pressure on opposite sides of the upper intermediate ring 13 is equalized to negate the destructive effect of engagement between the rings and the walls of the ring grooves. This is accomplished by the provision of a plurality of depressions in the cylinder liner illustrated at 26 which, as best shown in Fig. 4, register with and span the uppermost intermediate ring 13 when the piston is at bottom dead center position. The depressions 26 are herein shown at 8 in number but their precise number and size is not critical so long as they are sufficiently large to permit substantial equalization of pressure on opposite sides of the intermediate ring 13 or in the spaces 21 and 22 during the period of time that the piston is passing through its bottom dead center position. Thus upon each stroke of the piston the pressure in the spaces 21 and 22 is equalized and extensive ring groove wear which results from unequal pressures in these areas is eliminated. Furthermore, since the pressure has been equalized in the ring group area without substantial reduction, the pressure in this area, particularly during the exhaust stroke of the piston when the pressure in the combination chamber is low, urges lubricant upwardly or toward the head end of the piston into the compression ring area to prevent scuffing of the cylinder liner by the action of the compression ring thereagainst.

I claim:

1. In combination with a cylinder having a reciprocating piston therein wherein the piston has circumscribing grooves and expansible rings to form a seal against leakage of pressure from the head end of the piston, the improvement which comprises said cylinder having depressions in its inner wall which register with and span one only of said rings when the piston is in bottom dead center position to equalize pressure trapped in the ring area on opposite sides of said one ring.

2. In combination with a cylinder having a reciprocating piston therein wherein the piston has circumscribing grooves and expansible rings to form a seal against leakage of pressure from the head end of the piston, the improvement which comprises said cylinder having at least one depression in its inner wall in a position to register with an intermediate one of said rings and to span only said one ring when the piston is at bottom dead center position to equalize pressure on opposite sides of said one ring.

3. In combination with a cylinder having a reciprocating piston therein wherein the piston is provided with circumscribing grooves for the reception of a compression ring, an oil control ring, and intermediate rings, the improvement which comprises said cylinder having deformations in its wall in a position to form communication between opposite sides of at least one of said intermediate rings while the piston is in bottom dead center position to insure equalization of pressure in the ring zone without reducing pressure required to force lubricant to the compression ring area.

4. In combination with a cylinder having a reciprocating piston therein wherein the piston is provided with circumscribing grooves for the reception of a compression ring, an oil control ring, and two intermediate rings spaced from each other and from the compression ring and the oil control ring, the improvement which comprises depressions formed in the inner wall of the cylinder to register with and span the intermediate ring nearest the compression ring while the piston is passing through bottom dead center position to equalize pressure on opposite sides of said ring without bleeding pressure from the ring zone between the piston and cylinder.

No references cited.